United States Patent [19]

Mizusawa

[11] Patent Number: 5,400,083
[45] Date of Patent: Mar. 21, 1995

[54] NOISE REDUCTION APPARATUS FOR VIDEO SIGNAL

[75] Inventor: Tsutomu Mizusawa, Saitama, Japan

[73] Assignee: Kabushiki Kaisha Toshiba, Kanagawa, Japan

[21] Appl. No.: 89,191

[22] Filed: Jul. 12, 1993

[30] Foreign Application Priority Data

Jul. 22, 1992 [JP] Japan .................. 4-195528

[51] Int. Cl.$^6$ .............................................. H04N 5/21
[52] U.S. Cl. ...................................... 348/620; 348/607
[58] Field of Search ............... 358/167, 36, 105; H04N 5/21; 348/607, 618, 619, 620, 621, 624

[56] References Cited

U.S. PATENT DOCUMENTS

| | | | |
|---|---|---|---|
| 4,090,221 | 5/1978 | Connor | 358/105 |
| 4,242,705 | 12/1980 | Ebihara | 358/36 |
| 4,860,104 | 8/1989 | Katsuyama | 358/167 |
| 5,057,921 | 10/1991 | Robert | 358/105 |
| 5,091,925 | 2/1992 | Haendle et al. | 358/167 |
| 5,161,018 | 11/1992 | Matsunaga | 358/167 |
| 5,166,788 | 11/1992 | Lee | 358/167 |
| 5,185,664 | 2/1993 | Darby | 358/167 |
| 5,191,413 | 3/1993 | Edgar | 358/167 |
| 5,329,317 | 7/1994 | Naimpally et al. | 348/607 |

FOREIGN PATENT DOCUMENTS

| | | | |
|---|---|---|---|
| 2575886 | 7/1986 | France | H04N 5/21 |
| 62-22310 | 5/1987 | Japan | H04N 5/21 |
| 81588 | 3/1990 | Japan | 358/105 |

OTHER PUBLICATIONS

"A New Motion-Adaptive Video Processing System for TV Receivers and VCR's" by Tanaka et al IEEE Transaction on Consumer Electronics vol. 38, No. 3 Aug. 1992.

Primary Examiner—James J. Groody
Assistant Examiner—Chris Grant
Attorney, Agent, or Firm—Banner, Birch, McKie & Beckett

[57] ABSTRACT

A noise reduction apparatus includes a frame type noise processing circuit which detects a correlation between two successive frames of a video signal and reduces noncorrelating parts of the video signal. A processed signal from the frame type circuit is mixed with a delayed video signal at a rate determined according to a degree of motion of an image represented by the video signal. A line type noise processing circuit detects a correlation between two successive lines of a mixed video signal and reduces noncorrelating parts of the mixed video signal. The line type circuit is controlled so as to change a characteristic of noise processing according to the degree of motion.

15 Claims, 5 Drawing Sheets

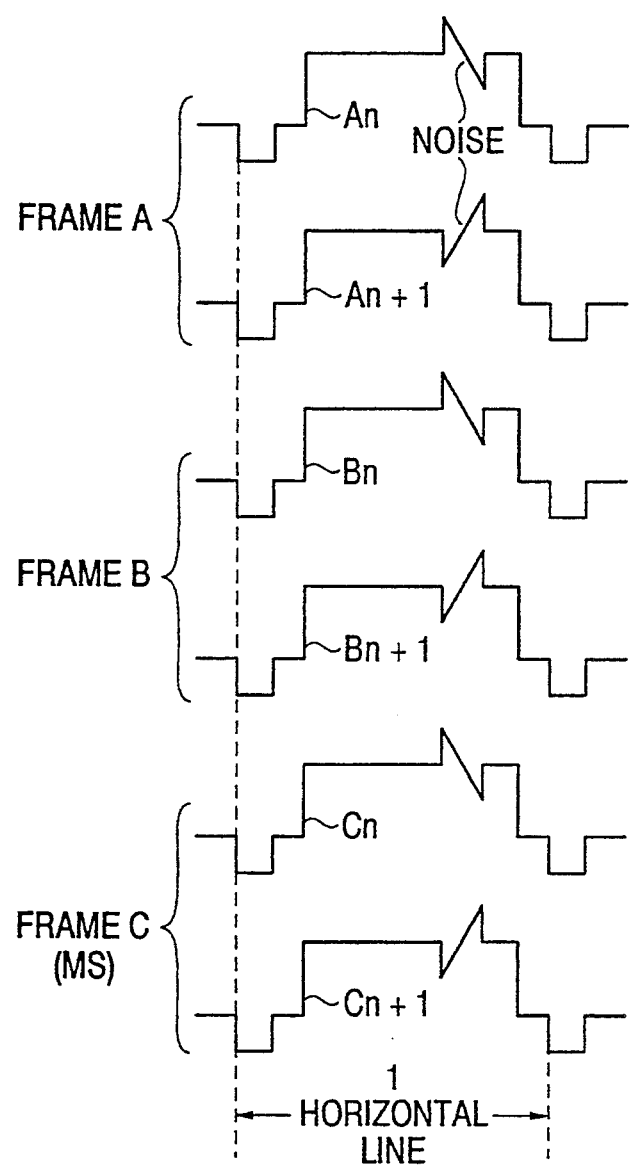

5,400,083

NOISE REDUCTION APPARATUS FOR VIDEO SIGNAL

BACKGROUND OF THE INVENTION

This invention relates to an apparatus for reducing noise mixed in a video signal, which is used in a television receiver or a video cassette recorder and so forth, and more paticularly it relates to a circuit for controlling a characteristic of noise reduction in accordance with a degree of motion of an image detected on the video signal.

FIG. 1A shows an arrangement of a conventional noise reduction apparatus. The apparatus includes two types of noise reduction processing circuits 2 and 5. The frame type processing circuit 2 functions to detect a correlation between a frame of video signal and the next frame by comparing them and reducing the noncorrelating parts as being the noise mixed in the video signal. For example, a frame type processing circuit can comprise an average circuit which produces an average signal having an intermediate level of two successive frames of the video signal, so that the noncorrelating parts of the frames are reduced. A memory 3 is provided for storing the previous frame of the video signal used for comparison. A line type noise processing circuit 5 detects a correlation between a horizontal line of the video signal and the next line and reduces noncorrelating parts. This line type circuit 5 can also comprise another average circuit.

A video signal at an input terminal 1 is supplied to the noise reduction processing circuits 2 and 5, and two output signals SF and SL are supplied to a mixing circuit 6. The mixing circuit 6 mixes the noise reduced signals SF and SL at a mixture rate which is determined by receiving a motion detecton signal MDS produced by a motion detector 4, and supplies a mixed signal MS to an output terminal 7. The motion detector 4 detects to what degree each noncorrelating part between two successive frames of the video signal has a noncorrelation. The detector 4 compares the two frames by the picture element in order to carry out the detection, and it uses the memory 3 in the same manner as the frame type processing circuit 2. The motion detection signal MDS is selected in accordance with the result of the detection and corresponds to the mixture rate of the mixing circuit 6.

For example, the mixing circuit 6 mixes the signal SF with the signal SL according to the formula:

$$SF \cdot k + SL \cdot (1-k), \quad 0 \leq k \leq 1.$$

The variable k depends on the motion detection signal MDS. If the signal MDS represents, as the result of the detection, that there is a large difference at a noncorrelating part, the variable k is set to a numerical value close or equal to "0". In this case, the noncorrelating part between two successive frames seems to be caused not by a noise but by a motion of the picture. Therefore, the frame type noise processing circuit 2 is limited from its performance because the noncorrelating part detected thereby is not a noise, instead the line type noise processing circuit 5 is more activated. On the other hand, if the motion detection signal MDS represents that the difference at the noncorrelating part is less than a predetermined level or two successive frames have a correlation, the variable k is set to numerical value being close or equal to "1". In such case, the image of the video signal seems like a still picture. Then the performance of the line type noise processing circuit 5 is limited because it is liable to make the picture less clear, instead the frame type circuit 2 is made the most of the ability.

However, the above mentioned conventional noise reduction apparatus can not reduce a noise having a correlation between two successive frames. For example, the noise somtimes occures at a fixed position on a screen. As shown in FIG. 1B, when the successive frames A and B have the same noises at the same positions on the same lines n and n+1, the frame type noise processing circuit 2 can not reduce the noises because there is no noncorrelating part between the two frames. Meanwhile the line type noise processing circuit 5 detects and reduces the noncorrelating part between the two lines. However, the motion detector 4 judges that the frames A and B have a correlation, so it transmits the motion detection signal MDS in order to make the mixing circuit 6 select the output signal SF from the frame type circuit 2 rather than the output signal SL from the line type circuit 5. Accordingly, the output signal MS from the mixing circuit 6, which corresponds to a frame C shown in FIG. 1B, still includes the noise.

The conventional noise reduction apparatus is subject to another problem. FIG. 1C shows an example of each signal waveform. When a horizontal line Sa of the video signal is different from the same line Sb of the next frame as shown in FIG. 1C, the motion detection signal MDS changes a point on the horizontal line at where a difference of amplitude between the two signals Sa and Sb reaches a predetermined level. In this example, the motion detection signal MDS is produced to have either a low level representing that variable k of the above formula is set equal to "1", or a high level representing that the variable k is set equal to "0". Therefore, the signal SF from the frame type circuit 2 passes through the mixing circuit 6 when the signal MDS is low, and oppositely the signal SL from the line type circuit 5 passes through the mixing circuit 6 when the signal MDS is high. In the case shown in FIG. 1C, the output signal MS of the mixing circuit 6 changes at a point on the horizontal line. Then, the signal MS has a waveform distortion at the change over point because of the difference of amplitude between the signals SF and SL. The waveform distortion appears on a screen.

Another type of conventional noise reduction apparatus uses a field type noise reduction processing circuit instead of the frame type circuit 2, which reduces noncorrelating parts between two successive fields of the video signal in the same manner as the frame type circuit 2, and it uses a motion detector which detects a difference between the two fields.

SUMMARY OF THE INVENTION

It is an object of the present invention to provide a noise reduction apparatus which is able to reduce noise mixed in a video signal and particulary to also reduce noise having a correlation between two successive frames or fields of the video signal.

Another object of the present invention is to provide an improved noise reduction apparatus which is able to prevent a waveform distortion from occurring at a change over point of the different types of noise reduction processing circuit.

Other and further objects of this invention will become obvious upon an understanding of the illustrative embodiment about to be described or will be indicated in the claims, and various advantages which are not referred to herein will occur to one skilled in the art upon employment of the invention in practice.

BRIEF DESCRIPTION OF THE DRAWINGS

FIGS. 1B and 1C are waveform charts showing an example of signals of the circuit block shown in FIG. 1A;

DETAILED DESCRIPTION OF THE INVENTION

An embodiment of this invention will now be explained with reference to the accompanying drawings.

Figure 1A:
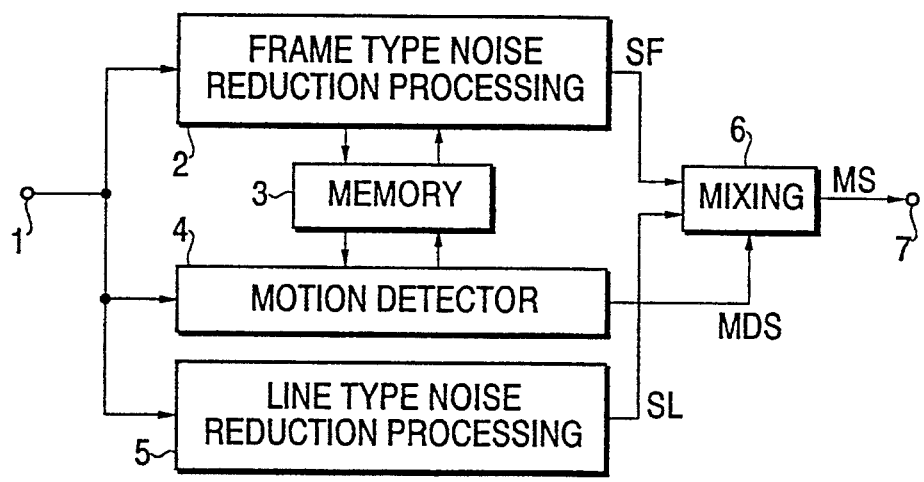
FIG. 1A is a schematic circuit block diagram showing a conventional noise reduction apparatus.
Figure 1C:
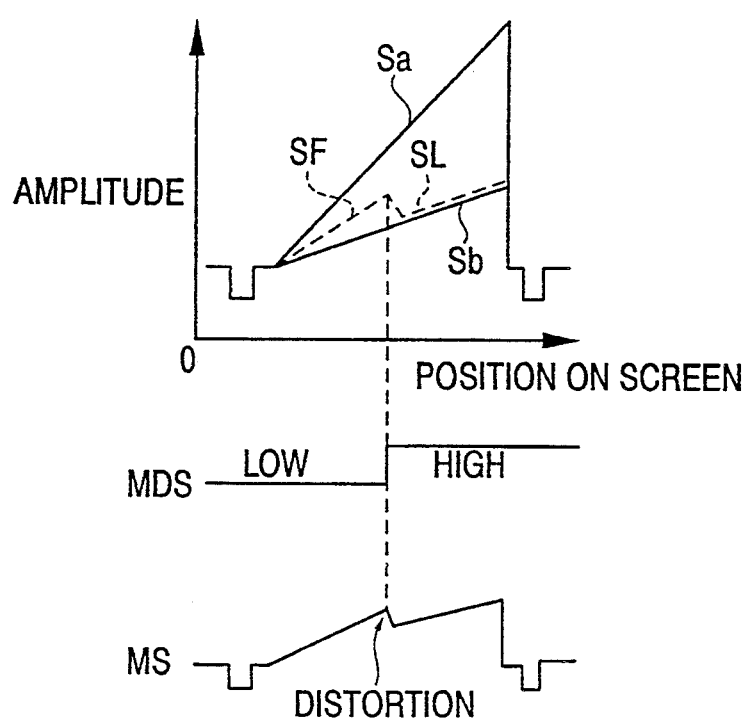
Figure 2A:
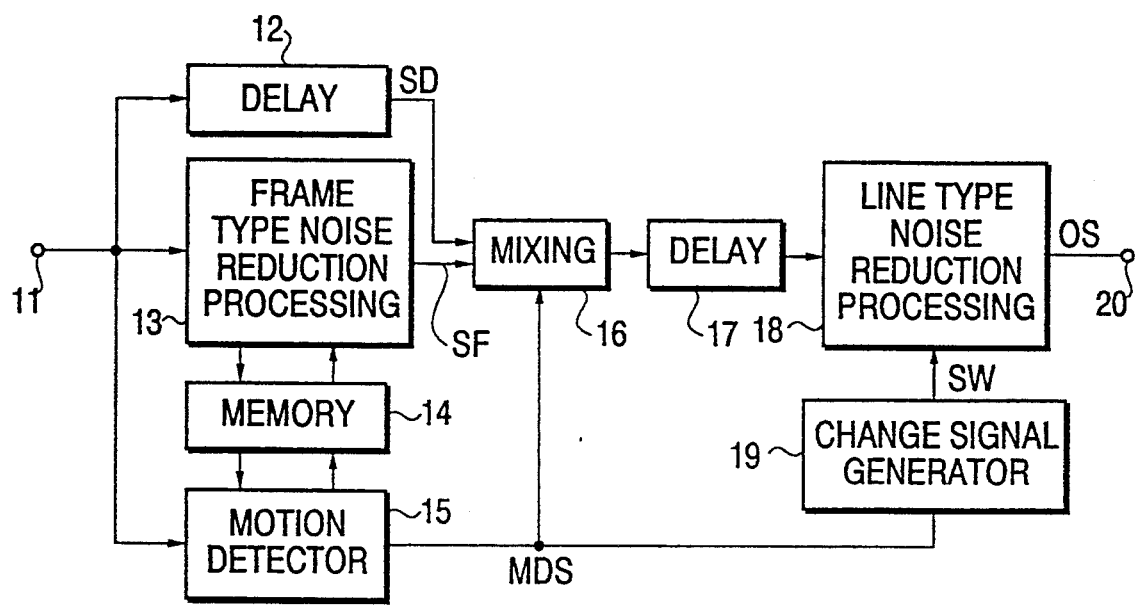
FIG. 2A is a schematic circuit block diagram showing a noise reduction apparatus according to an embodiment of the present invention.

As shown in FIG. 2A, a video signal at an input terminal 11 is supplied to a delay circuit 12, a frame type noise reduction processing circuit 13 and a motion detector 15. The frame type processing circuit 13 detects a correlation between two successive frames of the video signal, and reduces the noncorrelating parts as being the noise mixed in the video signal. It is possible that a field type noise reduction circuit which detects a correlation between two successive fields of the video signal is utilized instead of the frame type processing circuit 13. For that processing, an averaging circuit can be employed as the frame type circuit 13, which produces a signal SF having an intermediate level between a new frame of the video signal and the previous frame which has been stored in a memory 14. The delay circuit 12 has a delay time for synchronizing its own output signal SD with the output signal SF from the frame type circuit 13. The output signals SD and SF are supplied to a mixing circuit 16.

The mixing circuit 16 mixes the two signals SD and SF according to the following formula:

$$SF \cdot k + SL \cdot (1-k), \quad 0 \leq k \leq 1.$$

The variable k depends on a motion detection signal MDS produced by the motion detector 15. The motion detector 15 detects by the picture elements to what degree two successive frames of the video signal have a correlation, and it produces the signal MDS at a selected state according to the degree of correlation. In this embodiment, the motion detection signal MDS is selectively given two kinds of state. When a difference between the two successive frames is larger than a predetermined level, the motion detection signal MDS is produced to have a high level. If the field type circuit is utilized instead of the frame type circuit 13, the motion detector detects a difference between two successive fields. Then the noncorrelation in the detected part is considered to be caused by the motion of the picture. Therefore, the variable k of the above formula is set equal to "0", so that the signal SF from the frame type circuit 13 is not used, and instead the signal SD from the delay circuit 12 passes through the mixing circuit 16.

Meanwhile, when a difference between the two frames is less than the predetermined level, the signal MDS is produced to have a low level. In this case, the image of the video signal is considered to be like a still picture, and the noncorrelating part is considered to be noise. Then, the variable k is set equal to "1", so that the signal SF passes through the mixing circuit 16. The motion detector 15 uses the memory 14 for comparing the two frames in the same manner as the frame type processing circuit 13.

If the motion detector 15 can selectively produce the signal MDS having three kinds of state, such as low, middle and high levels, in accordance with the degree of correlation between two successive frames, the variable k can be set equal to one of three numerical values, such as "1", "½" and "0", respectively.

The output signal of the mixing circuit 16 is supplied to a line type noise reduction circuit 18 via a delay circuit 17. The line type circuit 18 detects a correlation between two successive horizontal lines of the video signal, and it reduces the noncorrelating parts as the noise mixed in the video signal. Then, the circuit 18 supplies the noise reduced output signal OS to an output terminal 20. Also, the line type circuit 18 is able to change its own characteristic by receiving a change signal SW from a change signal generator 19. The generator 19 sets the change signal SW taking a state according to the motion detection signal MDS. When the motion detection signal MDS represents that the image of the video signal is in motion, namely when MDS is at a high level, the change signal SW is also produced to have a high level, and the line type circuit 18 intensifies the noise reduction processing. On the other hand, when the signal MDS represents that the image is like a still picture, namely when MDS is at a low level, the change signal SW is produced to have a low level, and the line type circuit 18 limits the effect of the noise reduction processing so as to not make the picture less clear.

Figure 3A:
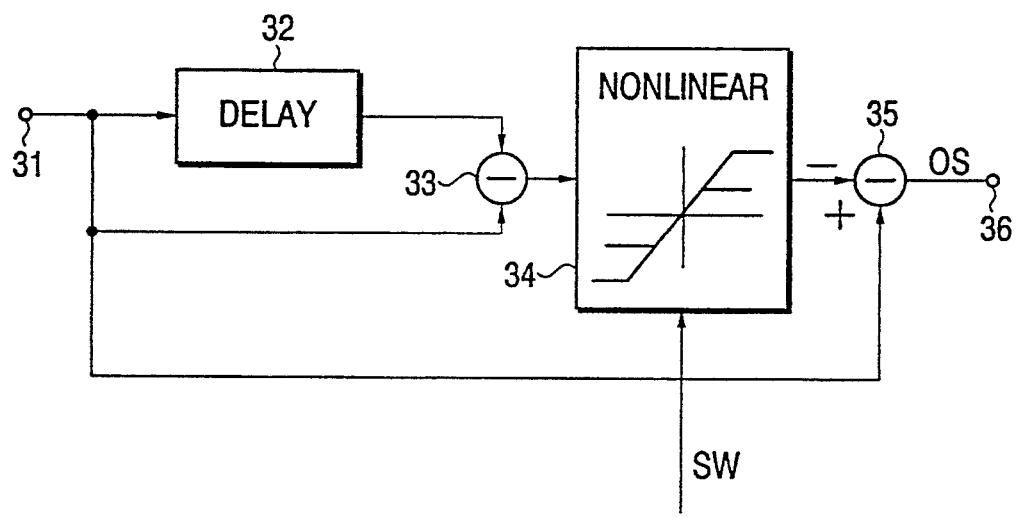
FIGS. 3A and 3B are a block diagram showing a line type noise reduction processing circuit shown in FIG. 2A and a graph showing a characteristic of the line type circuit, respectively.
Figure 3B:
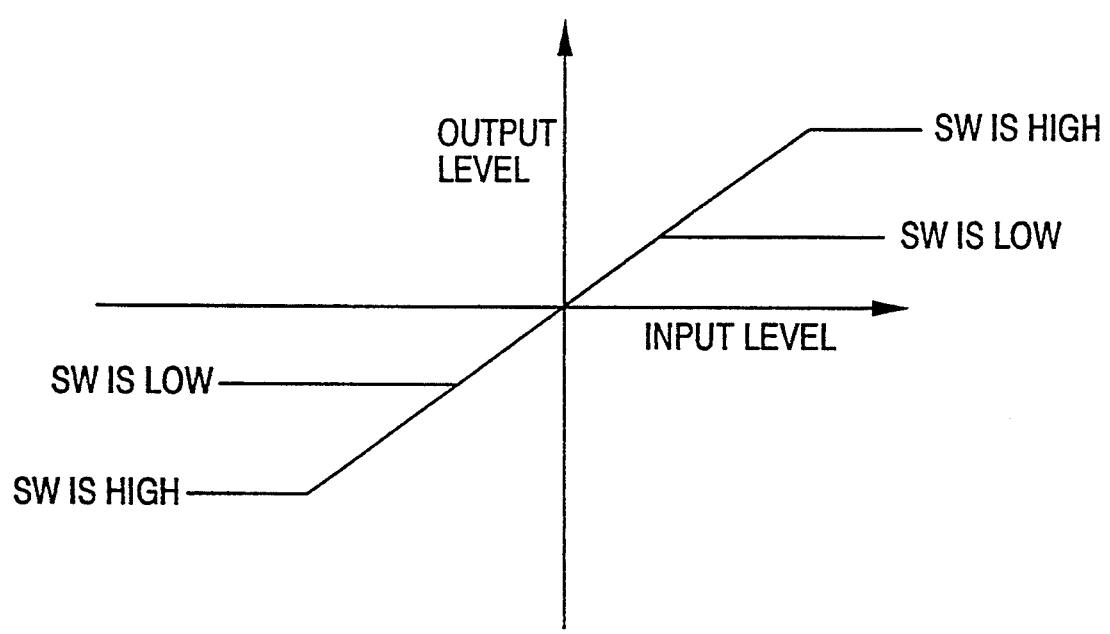

A structure of the line type processing circuit 18 is shown in FIG. 3A. An input signal supplied from the delay circuit 17 appears at an input terminal 31, and it is supplied to a delay circuit 32 and subtraction circuits 33 and 35. The delay circuit 32 has a delay time of one horizontal line scan, so the subtraction circuit 33 produces a difference signal between a new line and the previous line. The difference signal is supplied to a nonlinear circuit 34, and there it is processed in accordance with a nonlinear characteristic shown in FIG. 3B. The characteristic of the nonlinear circuit 34 is changed according to the change signal SW. As shown in FIG. 3B, the output level is clipped when the input level exceeds a reference level. The reference level is changed in accordance with the change signal SW. The output signal of the nonlinear circuit 34 is subtracted from the original input signal by the subtraction circuit 35. Therefore the noise reduced output signal OS is supplied to an output terminal 36.

In accordance with this embodiment, the noise reduction apparatus can reduce a noise having a correlation between two successive frames in addition to other types of noise. As shown in FIG. 2B, when the successive frames A and B have the same noises on the same lines n and n+1, the frame type noise processing circuit 13 can not reduce such noises. However, the line type noise processing circuit 18 can reduce such noises.

Therefore the output signal OS corresponding to a frame C (FIG. 2B) contains substantially no noise.

Figure 2C:
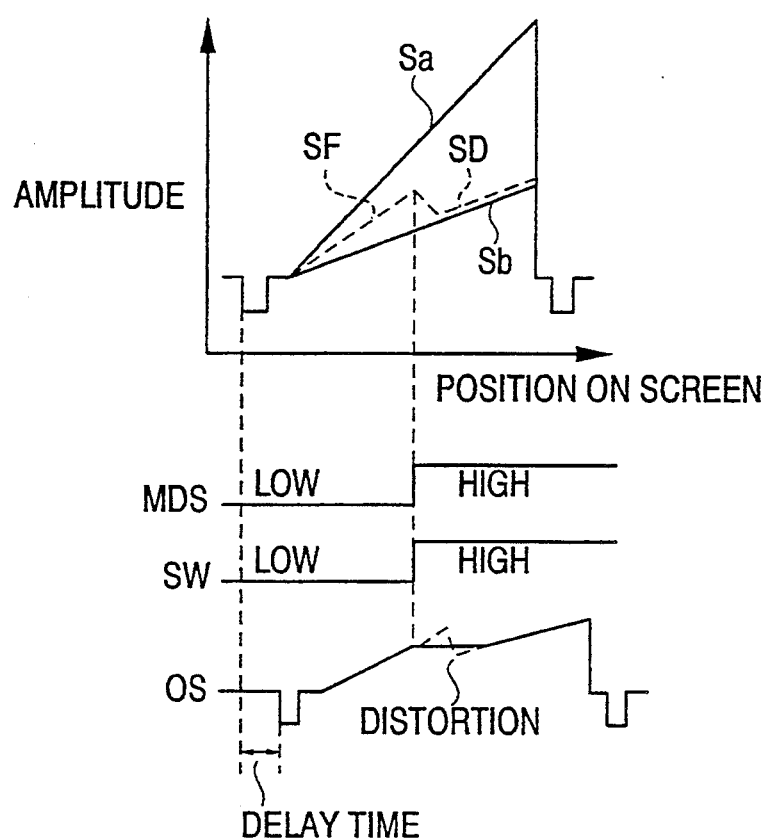
FIGS. 2B and 2C are waveform charts showing an example of signals of the circuit block shown in FIG. 2A.
Figure 2B:
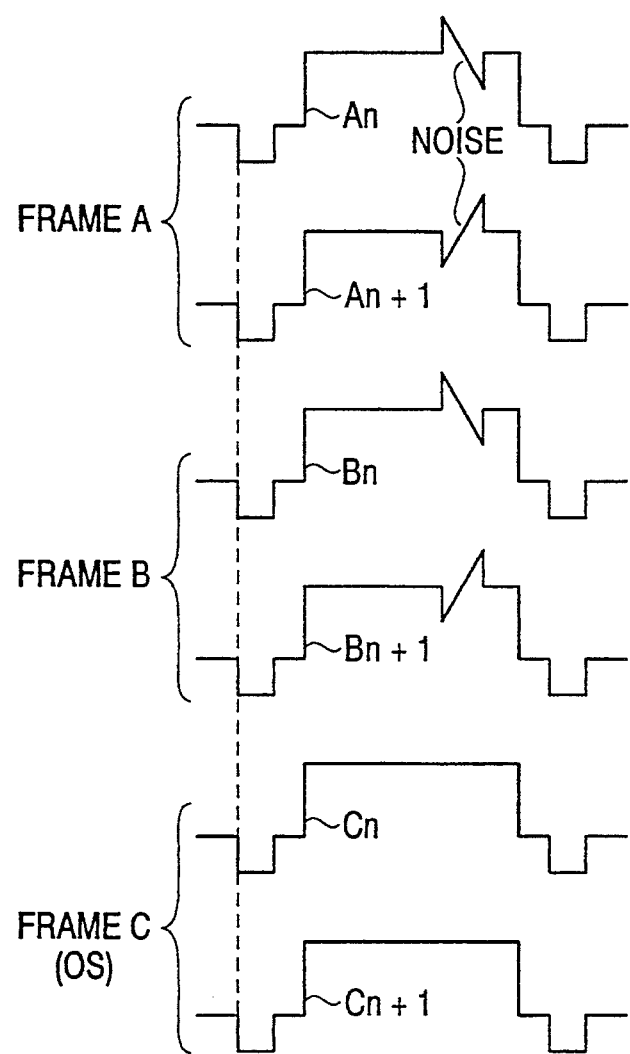

Also, as shown in FIG. 2C, when a difference between a horizontal line Sa of the video signal and the next line Sb increases, the motion detection signal MDS changes over from a low level to a high level at a point on the horizontal line. Therefore the output signal of the mixing circuit 16 has a waveform distortion at the change over point. However, the change signal SW changes over from a low level to a high level prior to the advent of the waveform distortion because the delay circuit 17 delays the output signal of the mixing circuit 16, so that the distortion is reduced by the intensified noise reduction processing of the line type circuit 18. The delay time of the delay circuit 17 depends on the characteristic of the line type circuit 18.

While in this embodiment a frame type noise reduction processing circuit is used for reducing noise mixed in the video signal of which the image is like a still picture, a field type noise processing circuit can be utilized instead. Then a motion detector detects a difference between two successive fields. Further, the other type of noise reduction processing circuit is not limited to a line type as the circuit 18 shown in FIG. 3A, so it will be effective even if a noise reduction processing circuit detects a noncorrelation between two different areas on a horizontal line independent of or in addition to detecting a noncorrelation between two successive lines, namely it processes in a field of the video signal.

As set forth hereinabove, the present invention provides a noise reduction apparatus which can particularly reduce noise having a correlation between two successive frames or fields of a video signal and can prevent a waveform distortion of occurrence at a change over point of the different types of noise reduction processing circuit.

While a preferred embodiment has been described, variations thereto will occur to those skilled in the art within the scope of the present inventive concepts which are delineated by the following claims.

What is claimed is:

1. Apparatus for reducing noise mixed in a video signal, the apparatus comprising:
   delay means, coupled to receive the video signal, for providing a delayed video signal;
   first noise processing means, coupled to receive the video signal, for detecting a correlation between two successive frames or two successive fields of the video signal, for reducing noncorrelating parts of the video signal caused by noise, and for providing a processed signal;
   motion detection means, coupled to receive the video signal, for detecting a degree of motion of an image represented by the video signal;
   mixing means for mixing the delayed signal and the processed signal at a first rate when the detected degree of motion is greater than a first predetermined level, and at a second rate when the detected degree of motion is less than a second predetermined level, and for providing a mixed video signal;
   second noise processing means for detecting a correlation between two areas in a field of the mixed video signal, for reducing noncorrelating parts of the mixed video signal, and for providing an output video signal; and
   control means for limiting an effect of the second noise processing means when the detected degree of motion is less than a third predetermined level.

2. Apparatus as claimed in claim 1, wherein the first predetermined level, the second predetermined level and the third predetermined level are the same level.

3. Apparatus as claimed in claim 1, wherein the delayed signal is solely used as the mixed video signal when the detected degree of motion is greater than the first predetermined level, and the processed signal is solely used as the mixed video signal when the detected degree of motion is less than the second predetermined level.

4. Apparatus as claimed in claim 1, wherein the second noise processing means detects a correlation between two successive horizontal lines in a field of the mixed video signal.

5. Apparatus as claimed in claim 1, wherein the control means changes a characteristic of the second noise processing means when the detected degree of motion is less than the third predetermined level.

6. Apparatus as claimed in claim 1, wherein the motion detection means detects the degree of motion by the picture elements of the video signal.

7. Apparatus as claimed in claim 6, wherein the apparatus further comprises:
   mixed signal delay means for delaying the mixed video signal and for supplying a delayed mixed signal to the second noise processing means; and
   wherein the delayed mixed signal is processed by the second noise processing means as the mixed video signal.

8. An apparatus for reducing noise in a video signal, said apparatus comprising:
   a delay circuit which receives the video signal and outputs a delayed video signal;
   a first noise processing circuit, which receives the video signal, for detecting a correlation between two portions of the video signal, for reducing non-correlated portions of the video signal caused by noise and for generating a processed video signal;
   a motion detector, which receives the video signal, for detecting a degree of motion between the two portions of the video signal and for generating a motion detection signal indicating the degree of motion;
   a mixing circuit for mixing the processed video signal and the delayed signal according to the motion detection signal and producing a mixed video signal; and
   a second noise processing circuit for detecting a degree of correlation between two areas in a field of the mixed video signal, for reducing non-correlated portions of the mixed video signal based on the motion detection signal, and for generating an output video signal.

9. The apparatus according to claim 8 further comprising control means which supplies a control signal to said second noise processing circuit for controlling, in response to the motion detection signal, reduction of the non-correlated portions of the mixed video signal.

10. The apparatus according to claim 9, wherein the control signal, when in a predetermined state, limits reduction of the non-correlated portions of the mixed video signal.

11. The apparatus according to claim 8, wherein the two portions of the video signal are one of two successive frames and two successive fields.

12. The apparatus according to claim 8, wherein said second noise processing circuit detects a degree of correlation between two successive horizontal lines in a field of the mixed video signal.

13. The apparatus according to claim 8, wherein the mixed video signal is the delayed video signal when the motion detection signal is in a first predetermined state and the mixed video signal is the processed video signal when the motion detection signal is in a second predetermined state.

14. The apparatus according to claim 8, wherein the motion detector detects the degree of motion of picture elements in the video signal.

15. The apparatus according to claim 8 further comprising a mixed signal delay circuit for delaying the mixed video signal and for supplying the delayed mixed video signal to said second noise processing circuit, the delayed mixed video signal being processed as the mixed video signal by said second noise processing circuit.

* * * * *